United States Patent
Makimoto et al.

(10) Patent No.: US 8,064,780 B2
(45) Date of Patent: Nov. 22, 2011

(54) RECEIVING DEVICE AND RECEIVING METHOD

(75) Inventors: Takahiro Makimoto, Kawasaki (JP); Noriaki Mizuguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 786 days.

(21) Appl. No.: 11/984,995

(22) Filed: Nov. 26, 2007

(65) Prior Publication Data
US 2008/0137778 A1 Jun. 12, 2008

(30) Foreign Application Priority Data
Dec. 7, 2006 (JP) .................. 2006-330792

(51) Int. Cl.
*H04B 10/06* (2006.01)

(52) U.S. Cl. ........ 398/208; 398/209; 398/212; 398/213; 398/25; 398/27

(58) Field of Classification Search .............. 398/25–27, 398/202–214
See application file for complete search history.

(56) References Cited

U.S. PATENT DOCUMENTS

| | | | |
|---|---|---|---|
| 2005/0105900 A1* | 5/2005 | Akimoto et al. ................ 398/16 |
| 2006/0067703 A1* | 3/2006 | Haunstein et al. ............ 398/161 |
| 2006/0193640 A1* | 8/2006 | Katagiri et al. ................ 398/188 |
| 2006/0200710 A1* | 9/2006 | Webb et al. .................... 714/704 |
| 2006/0209681 A1* | 9/2006 | Yamamoto ..................... 370/218 |
| 2007/0058988 A1* | 3/2007 | Yonenaga ...................... 398/186 |

FOREIGN PATENT DOCUMENTS

JP 3-79141 4/1991

* cited by examiner

*Primary Examiner* — Li Liu

(57) ABSTRACT

A demodulating unit demodulates a differential M-phase shift keying signal light by causing delay and interference. A phase-error detecting unit detects an error of a control phase amount of the delay and the interference caused by the demodulating unit. A control unit adjusts the control phase amount to a predetermined phase amount based on the error. A data processing unit monitors an error state of data signal that is demodulated by the demodulating unit. The control unit changes the control phase amount from the predetermined amount when the error state is in a predetermined state, and determines a reception state of the differential M-phase shift keying signal light based on an error that is detected after the control phase amount is changed.

10 Claims, 6 Drawing Sheets

RECEIVING DEVICE AND RECEIVING METHOD

CROSS-REFERENCE TO RELATED APPLICATIONS

This application is based upon and claims the benefit of priority from the prior Japanese Patent Application No. 2006-330792, filed on Dec. 7, 2006, the entire contents of which are incorporated herein by reference.

BACKGROUND OF THE INVENTION

1. Field of the Invention

The present invention relates to a technology of detecting an input break of differential M-phase shift keying signal light in an optical communication system, where $M=2^n$ (n is a positive integer).

2. Description of the Related Art

Conventionally, in optical communication systems as typified by the Internet of recent years, use of an optical communication system using a differential quadrature phase shift keying (DQPSK) is considered as a communication method in which frequency utilization efficiency is improved, to respond to rapidly increasing demand for data communication. Moreover, in the optical communication system, an input-break detecting circuit to prevent an improper operation caused by a noise originated in an input break of a DQPSK signal light has been used (for example, Japanese Patent Laid-Open Publication No. H3-79141).

FIG. 5 is a block diagram of a conventional optical communication system. As shown in FIG. 5, a DQPSK signal light transmitted by a transmitting device (Tx) 510 is multiplexed by a multiplexing unit 520, and input to a demultiplexing unit 540 through a repeater 531 and a repeater 532. The multiplexed DQPSK is demultiplexed by the demultiplexing unit 540 and received by a receiving device 550. The receiving unit 550 includes an amplifier 551, an input-break detecting circuit 552, a virtually imaged phased array (VIPA) as a dispersion compensator 553, an amplifier 554, a demodulator 555, a data processing unit (FRAMER+FEC) 556.

The input-break detecting circuit 552 detects an input break of a DQPSK signal light by monitoring an average value of power of light input to the amplifier 551. The demodulator 555 includes a delay interferometer and a phase-error detecting circuit to detect a phase error in a control phase amount, and demodulates the DQPSK signal light. The data processing unit 556 performs a logic processing such as error correction, based on a data signal demodulated by the demodulator 555.

FIG. 6 is a flowchart of an operation of a conventional receiving device. As shown in FIG. 6, first, it is determined whether power of an input light is equal to or higher than a threshold (step S601). When the power is lower than the threshold (step S601: NO), it is determined as an input break of the DQPSK signal light. Thus, a series of processes is ended. When the power is equal to or higher than the threshold (step S601: YES), a phase amount of the delay interferometer in the demodulator 555 is controlled (step S602).

Next, it is determined whether an output value of the phase-error detecting circuit is within a predetermined range (step S603). When the output value of the phase-error detecting circuit is not within the predetermined range (step S603: NO), the process returns to step S602, to continue processing. When the output value is within the predetermined range (step S603: YES), a control of a dispersion compensation amount and a logic processing are performed (step S604).

Subsequently, it is determined whether a bit error rate (BER) of the data signal is equal to or higher than a threshold (step S605). When the BER is lower than the threshold (step S605: NO), the process returns to step S604 to continue processing. When the BER is equal to or higher than the threshold (step S605: YES), a normal operation is started (step S606), and a series of processes is ended.

However, in the conventional technique described above, the input-break detecting circuit 552 monitors the average value of power of the input light without distinguishing the DQPSK signal light from a noise component. Therefore, even when the input light is a white light such as amplified spontaneous emission (ASE) light not including the DQPSK signal light, if the power of the white light is high, an input break of the DQPSK signal light cannot be detected.

Furthermore, when only white light is input, an output voltage becomes 0 volt (V), and the phase-error detecting circuit of the demodulator 555 cannot distinguish this from a case where the control phase amount for the DQPSK signal light is appropriate. Accordingly, although the DQPSK signal light is not properly received, the operations at steps S601 to S606 are performed, and the BER is not equal to or higher than the threshold. As a result, the operations at steps S604 and S605 are endlessly repeated.

Thus, the receiving device 550 becomes out of control. In addition, because the control of the dispersion compensation amount is continuously repeated, the dispersion compensator 553 can break down. Moreover, to determine whether the DQPSK signal light is included in input light, an instrument for measuring waveforms of the input light, such as a spectrum analyzer, is separately required.

SUMMARY OF THE INVENTION

It is an object of the present invention to at least solve the problems in the conventional technologies.

A receiving device according to one aspect of the present invention includes a demodulating unit that demodulates a differential M-phase shift keying signal light by causing delay and interference, where $M=2^n$ and n is a positive integer; a detecting unit that detects an error of a control phase amount of the delay and the interference; an adjusting unit that adjusts the control phase amount to a predetermined phase amount, based on the detected error; a monitoring unit that monitors an error state of data signal that is obtained by demodulation by the demodulating unit; and a control unit that controls the adjusting unit to change, when the error state is in a predetermined state, the control phase amount from the predetermined phase amount, and that determines a reception state of the differential M-phase shift keying signal light based on an error of the control phase amount that is detected after the control phase amount is changed.

A receiving method according to another aspect of the present invention includes demodulating a differential M-phase shift keying signal light by causing delay and interference, where $M=2^n$ and n is a positive integer; detecting an error of a control phase amount of the delay and the interference; adjusting the control phase amount to a predetermined phase amount, based on the detected error; monitoring an error state of data signal that is obtained by demodulation at the demodulating; changing, when the error state is in a predetermined state, the control phase amount from the predetermined phase amount; and determining a reception state of the differential M-phase shift keying signal light based on an error of the control phase amount that is detected after the control phase amount is changed.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention are explained in detail below with reference to the accompanying drawings.

Figure 1:
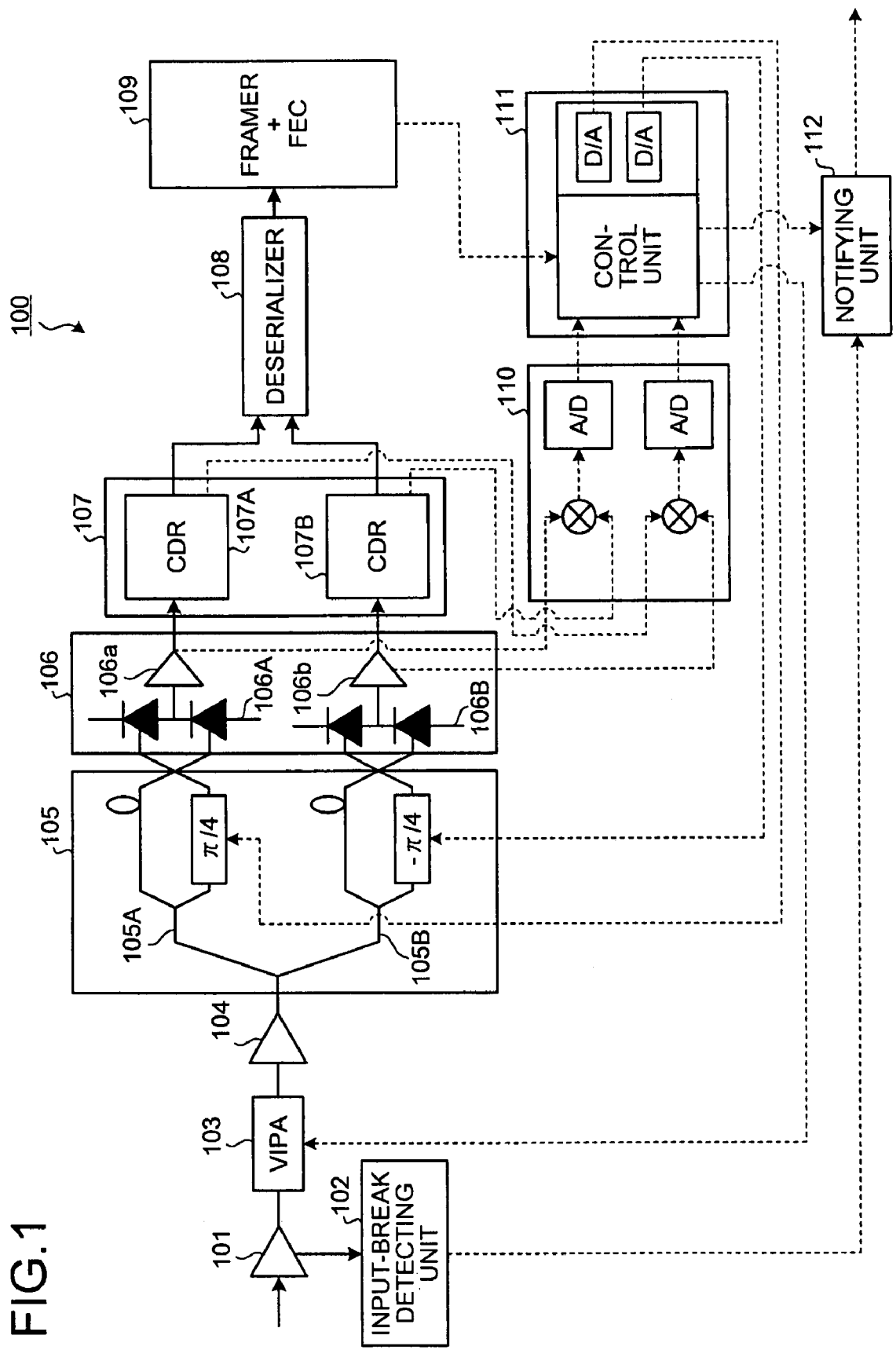
FIG. 1 is a block diagram of a receiving device according to an embodiment of the present invention.

FIG. 1 is a block diagram of a receiving device according to an embodiment of the present invention. As shown in FIG. 1, a receiving device 100 according to the embodiment includes an amplifier 101, an input-break detecting unit 102, a dispersion compensator (VIPA) 103, an amplifier 104, a delay interferometer 105, a photoelectric converter 106, a clock and data recovery (CDR) as a recovery unit 107, a deserializer 108, a data processing unit (FRAMER+FEC) 109, a phase-error detecting unit 110, a control unit 111, and a notifying unit 112.

The amplifier 101 amplifies received DQPSK signal light. The input-break detecting unit 102 monitors input light that is input to the amplifier 101, and detects an input break of the DQPSK signal light to be input to the amplifier 101. When the input-break detecting unit 102 detects an input break of the DQPSK signal light to be input to the amplifier 101, the input-break detecting unit 102 sends information indicating detection of the input break to the notifying unit 112.

The dispersion compensator 103 performs dispersion compensation by a variable dispersion compensation amount on the DQPSK signal light that is output from the amplifier 101. The dispersion compensator 103 changes the dispersion compensation amount under the control of the control unit 111. The dispersion compensator 103 outputs the DQPSK signal light on which the dispersion compensation has been performed to the amplifier 104. The dispersion compensator 103 in this example is constituted of a VIPA. The amplifier 104 amplifies the DQPSK signal light that is output from the dispersion compensator 103 and outputs the DQPSK signal light to the delay interferometer 105.

The delay interferometer 105, the photoelectric converter 106, and the recovery unit 107 constitute a demodulating unit that demodulates the DQPSK signal light. The delay interferometer 105 delays the DQPSK signal light and makes the DQPSK signal light interfere with each other. A coherent light thus obtained is output to the photoelectric converter 106. Specifically, the delay interferometer 105 has an arm 105A and an arm 105B. The delay interferometer 105 divides the DQPSK signal light to input the DQPSK signal light to the arm 105A and the arm 105B.

The arm 105A further divides the DQPSK signal light, and delays one of the divided DQPSK signal lights to be delayed by 1 bit, and controls the other one only for $\pi/4$, to cause the divided DQPSK signal light to interfere with each other. The arm 105B further divides the DQPSK signal light, and delays one of the divided DQPSK signal lights by 1 bit, and controls the other one only for $-\pi/4$, to cause the divided DQPSK signal light to interfere with each other. The arms 105A and 105B respectively output coherent light thus obtained to the photoelectric converter 106.

The photoelectric converter 106 receives the coherent light output from the delay interferometer 105, and performs photoelectric conversion on the received coherent light and outputs the obtained electrical signal to the recovery unit 107. Specifically, the photoelectric converter 106 has a dual pin photodiode 106A and a dual pin photo diode 106B. The dual pin photodiode 106A receives two coherent light beams output from the arm 105A and converts the coherent light beams into an electrical signal to send to the recovery unit 107.

The dual pin photodiode 106B receives two coherent light beams output from the arm 105B, and converts the coherent light beams into an electrical signal to send to the recovery unit 107. The electrical signals sent to the recovery unit 107 from the dual pin photodiodes 106A and 106B are amplified by amplifiers 106a and 106b, respectively.

The recovery unit (CDR) 107 recovers a data signal based on the electrical signals received from the photoelectric converter 106, and outputs the recovered data signal to the data processing unit 109. Specifically, the recovery unit 107 has a recovery circuit 107A and a recovery circuit 107B. The recovery circuit 107A recovers an I (in-phase) component from the electrical signal received from the dual pin photodiode 106A, to send to the deserializer 108.

The recovery circuit 107B recovers a Q (quadrature-phase) component from the electrical signal received from the dual pin photodiode 106B, to send to the deserializer 108. The deserializer 108 multiplexes the I component and the Q component to convert into a data signal before subjected to the DQPSK conversion, and outputs the data signal to the data processing unit 109.

The data processing unit 109 performs a logical processing such as error correction based on the data signal output from the deserializer 108. The data processing unit 109 monitors an error state of the data signal that has been demodulated by the delay interferometer 105, the photoelectric converter 106, and the recovery unit 107. For example, the data processing unit 109 monitors a BER of the data signal by monitoring an error correction bit count by forward error correction (FEC). The data processing unit 109 sends information on the error state of the data signal to the control unit 111.

The phase-error detecting unit 110 detects an error in a control phase amount of the delay interferometer 105. Specifically, the phase-error detecting unit 110 detects an error in the control phase amount based on an output from the photoelectric converter 106 and the recovery unit 107, and outputs information on the detected error in the control phase amount to the control unit 111. The phase-error detecting unit 110 is a phase-error detecting circuit that changes an output voltage corresponding to an error in the control phase amount. The phase-error detecting unit 110 has a multiplier circuit that multiplies the output from the photoelectric converter 106 and the recovery unit 107, and an analog/digital (A/D) converter circuit that performs A/D conversion on the multiplied output.

The control unit 111 has a function of adjusting the control phase amount of the delay interferometer 105, a function of determining a reception state of the DQPSK signal light, and a function of changing the dispersion compensation amount in the dispersion compensation performed by the dispersion compensator 103. The control unit 111 adjusts the control phase amount to a predetermined phase amount based on the information on the error detected by the phase-error detecting unit 110. Specifically, the control unit 111 adjusts the control phase amount at the arm 105A of the delay interferometer 105 to $\pi/4$, and the control phase amount at the arm 105B to $-\pi/4$.

Furthermore, the control unit 111 changes the dispersion compensation amount in the dispersion compensation performed by the dispersion compensator 103 based on the information on the error state of the data signal that is output from the data processing unit 109. For example, the control unit 111 adjusts the dispersion compensation amount such that the BER of the data signal is minimized, based on the information on the BER of the data signal output from the data processing unit 109.

Moreover, the control unit 111 controls an adjusting unit so that the control phase amount is changed from the predetermined amount when the error state of the data signal is in a predetermined state, based on the information on the error state. For example, the control unit 111 gradually changes the control phase amounts at the arm 105A and the arm 105B from $\pi/4$ and $-\pi/4$, when the BER of the data signal is lower than a threshold.

After the control phase amounts of the delay interferometer 105 are changed from the predetermined phase amount, the control unit 111 determines the reception state of the DQPSK signal light based on the information on the error that is output from the phase-error detecting unit 110. The determination of the reception state of the DQPSK signal light includes determination whether DQPSK signal light is included in received light, and determination whether a signal/ASE ratio of received light is equal to or higher than a threshold.

The control unit 111 determines the reception state of the DQPSK signal light based on whether the error detected by the phase-error detecting unit 110 changes according to the change in the control phase amount. Furthermore, the control unit 111 sends a result of determination of the reception state of the DQPSK signal light to the notifying unit 112. For example, when the control unit 111 determines that DQPSK signal light is not included in the received light, the control unit 111 sends information indicating the same to the notifying unit 112.

The control unit 111 is constituted of, for example, a central processing unit (CPU) that executes a program, a recording medium such as a read only memory (ROM) to store the program, a random access memory (RAM) used as a work area of the CPU, and the like. In this case, the control unit 111 performs the processing described above by executing a program recorded on the ROM.

When the notifying unit 112 receives the information indicating that an input break is detected from the input-break detecting unit 102, the notifying unit 112 notifies the transmitting device that has transmitted the DQPSK signal light that an input break is detected. Moreover, when the notifying unit 112 receives the result of determination of the reception state of the DQPSK signal light from the control unit 111, the notifying unit 112 informs the result to the transmitting device that has transmitted the DQPSK signal light.

Figure 2:
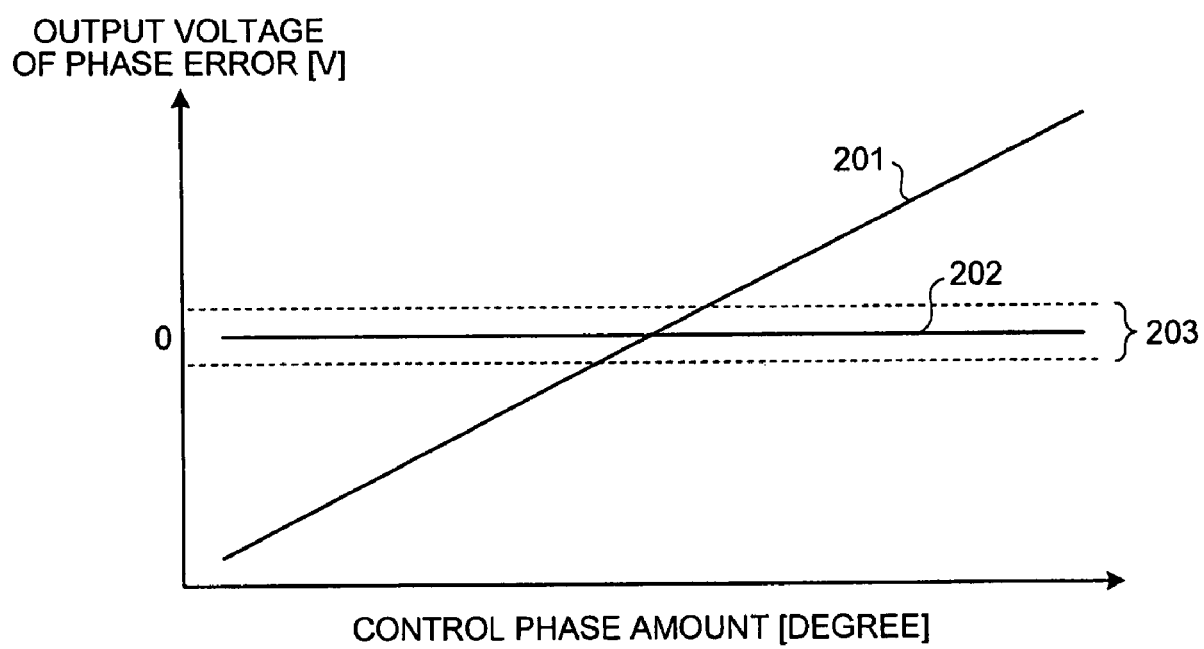
FIG. 2 is a graph showing relation between a control phase amount controlled by a control unit and an output voltage of a phase-error detecting unit.

FIG. 2 is a graph showing relation between a control phase amount controlled by the control unit and an output voltage of the phase-error detecting unit. A phase-error output characteristic 201 shown in FIG. 2 indicates relation between a control phase amount of the delay interferometer 105 controlled by the control unit 111 and an output voltage of the phase-error detecting unit 110 when the receiving device 100 receives light including DQPSK signal light.

A phase-error output characteristic 202 indicates relation between a control phase amount of the delay interferometer 105 controlled by the control unit and an output voltage of the phase-error detecting unit 110 when the receiving device 100 receives light not including DQPSK signal light. A range 203 indicates a range in which the control phase amount of the delay interferometer 105 becomes a predetermined amount (for example, $\pi/4$ or $-\pi/4$) when the receiving device 100 receives light including DQPSK signal light. The control unit 111 adjusts the control phase amount such that the output voltage of the phase-error detecting unit 110 is within the range 203.

As shown in FIG. 2, when the receiving device 100 receives light including DQPSK signal light, if the control unit 111 changes the control phase amount of the delay interferometer 105, the output voltage of the phase-error detecting unit 110 changes according to the change of the control phase amount. In this case, the control unit 111 determines that the light received by the receiving device 100 includes DQPSK signal light.

On the other hand, when the receiving unit 100 receives light not including DQPSK signal light, the output voltage of the phase-error detecting unit 110 is 0 regardless of the control phase amount of the delay interferometer 105. Therefore, even if the control unit 111 changes the control phase amount of the delay interferometer 105, there is no change in the output voltage of the phase-error detecting unit 110. In this case, the control unit 111 determines that the light received by the receiving device 100 does not include DQPSK signal light.

Moreover, when the change in the output voltage of the phase-error detecting unit 110 is different from an ordinary case, even when the output voltage changes according to the change in the control phase amount, the control unit 111 determines that the signal/ASE ratio of the light received by the receiving device 100 is not normal.

Figure 3:
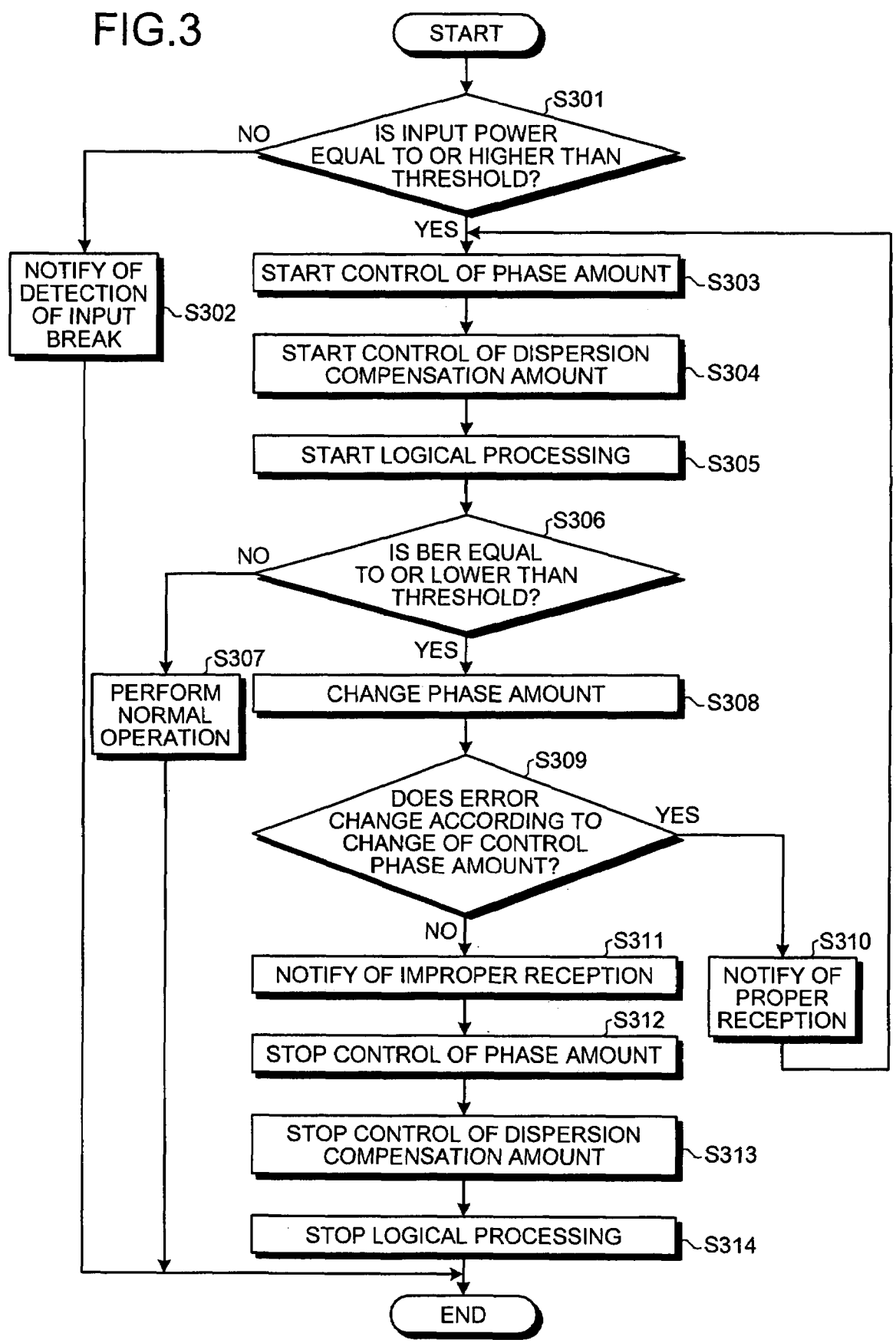
FIG. 3 is a flowchart of an operation of the receiving device.

FIG. 3 is a flowchart of an operation of the receiving device according to the embodiment. As shown in FIG. 3, first, the input-break detecting unit 102 determines whether input power of received DQPSK signal light is equal to or higher than a threshold (step S301). When the input power of the DQPSK signal light is lower than the threshold (step S301: NO), the notifying unit 112 notifies the transmitting device of detection of an input break (step S302), and a series of processes is ended.

When the input power is equal to or higher than the threshold (step S301: YES), the control unit starts the control of the phase amount of the delay interferometer 105 (step S303). Next, the control unit 111 starts the control of the dispersion compensation amount of the dispersion compensator 103 (step S304). Subsequently, the data processing unit 109 starts a logical processing of the data signal (step S305).

The control unit 111 then determines whether a BER is equal to or lower than a threshold (step S306). When the BER is higher than the threshold (step S306: NO), the receiving device 100 performs a normal operation (step S307), and a series of processes is ended. When the BER is equal to or lower than the threshold (step S306: YES), the control unit 111 changes a phase amount of the delay interferometer 105 (step S308).

Next, the control unit 111 determines whether the error detected by the phase-error detecting unit 110 changes according to the change of the control phase amount (step S309). When the error changes according to the change of the control phase amount (step S309: YES), the notifying unit 112 notifies the transmitting device that the DQPSK signal light is properly received (step S310), and the process returns to step S303. When the error does not change according to the change of the control phase amount (step S309: NO), the notifying unit 112 notifies the transmitting device that the DQPSK signal light is not properly received (step S311).

Subsequently, the control unit 111 stops the control of the phase amount of the delay interferometer 105 (step S312). The control unit 111 then stops the control of the dispersion compensation amount of the dispersion compensator 103 (step S313). Next, the data processing unit 109 stops the logical processing of the data signal (step S314), and a series of processes is ended. The processes at steps S303 to S305 and steps S311 to S314 are not necessarily required to be performed in this order, and can be performed simultaneously.

Figure 4:
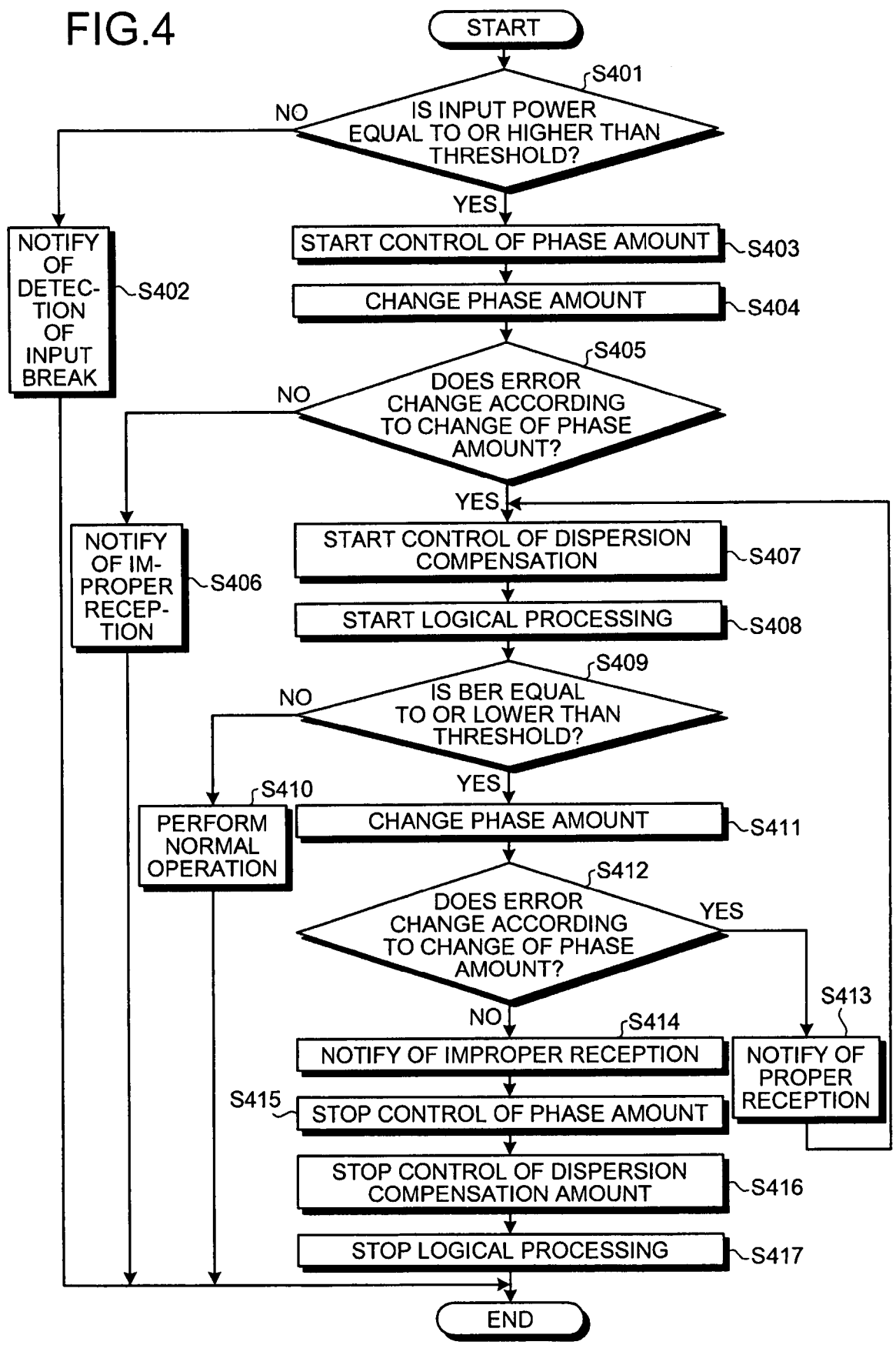
FIG. 4 is a flowchart of another operation of the receiving device.
Figure 5:
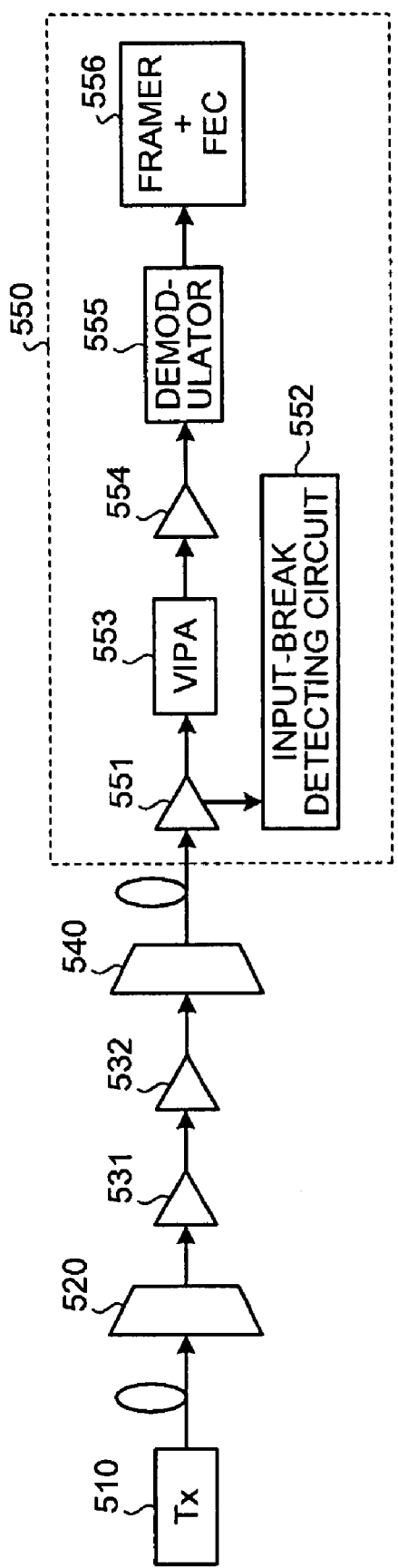
FIG. 5 is a block diagram of a conventional optical communication system.
Figure 6:
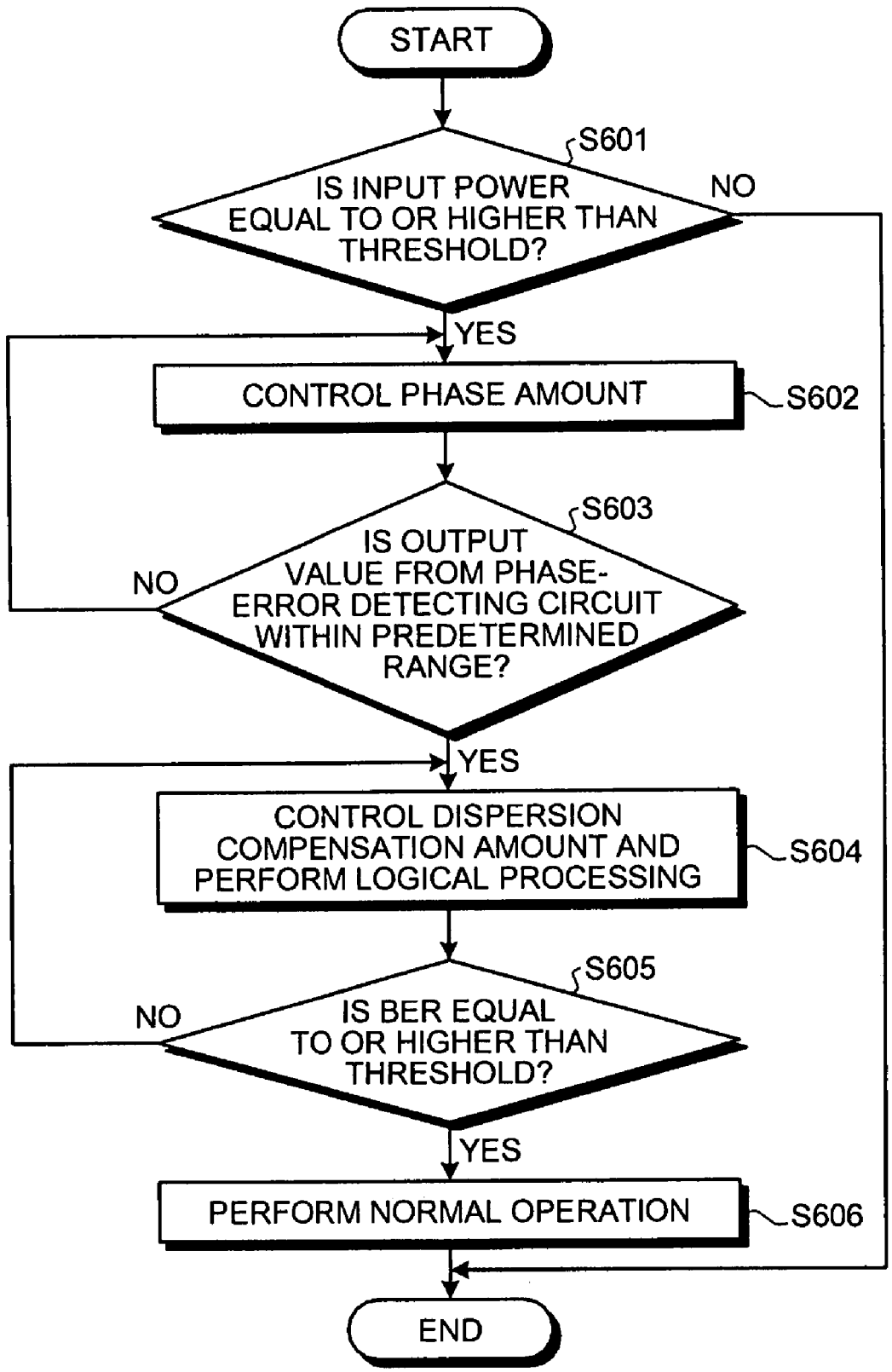
FIG. 6 is a flowchart of an operation of the conventional receiving device.

FIG. 4 is a flowchart of another operation of the receiving device according to the embodiment. As shown in FIG. 4, first the input-break detecting unit 102 determines whether the input power of the DQPSK signal light is equal to or higher than a threshold (step S401). When the input power is lower than the threshold (step S401: NO), the notifying unit notifies the transmitting device of detection of an input break (step S402), and a series of processes is ended.

When the input power is equal to or higher than the threshold (step S401: YES), the control unit 111 starts the control of the phase amount of the delay interferometer 105 (step S403). Next, the control unit 111 changes the phase amount of the delay interferometer 105 (step S404). The control unit 111 then determines whether the error detected by the phase-error detecting unit 110 changes according to the change of the control phase amount (step S405).

When the error does not change according to the change of the control phase amount (step S405: NO), the notifying unit 112 notifies the transmitting device that the DQPSK signal light is not properly received (step S406), and a series of processes is ended. When the error changes according to the change of the control phase amount (step S405: YES), the control unit 111 starts the control of the dispersion compensation amount of the dispersion compensator 103 (step S407).

Next, the data processing unit 109 starts a logical processing of the data signal (step S408). The data processing unit then determines whether a BER is equal to or lower than a threshold (step S409). When the BER is higher than the threshold (step S409: NO), the receiving device 100 performs a normal operation (step S410), and a series of processes is ended. When the BER is equal to or lower than the threshold (step S409: YES), the control unit 111 changes the phase amount of the delay interferometer 105 (step S411).

Subsequently, the control unit 111 determines whether the error detected by the phase-error detecting unit 110 changes according to the change of the control phase amount (step S412). When the error changes according to the change of the control phase amount (step S412: YES), the notifying unit 112 notifies the transmitting unit that DQPSK signal light is properly received (step S413), and the process returns to step S407. When the error does not change according to the change of the control phase amount (step S412: NO), the notifying unit 112 notifies the transmitting unit that DQPSK signal light is not properly received (step S414).

Next, the control unit 111 stops the control of the phase amount of the delay interferometer 105 (step S415). The control unit 111 then stops the control of the dispersion compensation amount of the dispersion compensator 103 (step S416). Subsequently, the data processing unit 109 stops the logical processing of the data signal (step S417), and a series of processes is ended. The processes at steps S407 to S408 and steps S414 to S417 are not necessarily required to be performed in this order, and can be performed simultaneously.

In the operations shown in FIGS. 3 and 4, whether the error changes according to the change of the control phase amount is determined, and it is determined that DQPSK signal light is properly received when the error changes according to the change of the control phase amount. However, even if the error changes according to the change of the control phase amount, when the change of the error is not normal, it can be determined that the signal/ASE ratio of the received light is not normal, and the same processing as that performed when it is determined that DQPSK signal light is not properly received can be performed.

As described, according to the receiving device 100 of the embodiment, the control unit 111 changes the phase amount of the delay interferometer 105 from a predetermined amount, thereby detecting an input break of DQPSK signal light even when the input power of white light is high.

As described above, according to the DQPSK receiving device and the DQPSK receiving method, an input break of DQPSK signal light can be detected even when the input power of white light is high. Therefore, it is possible to prevent the receiving device from being out of control, or the dispersion compensator from being damaged. Moreover, an input break of DQPSK signal light can be detected without separately preparing a measuring instrument such as a spectrum analyzer.

While in the above embodiment, the receiving device 100 is explained as a DQPSK receiving device that receives DQPSK signal light, the present invention is not limited to the case of DQPSK, and is applicable to a receiving device that is compatible with various types of differential M-phase shift keying such as DPSK.

According to the embodiments described above, an input break of a differential M-phase shift keying signal light can be detected even when input power of white light is high.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A receiving device comprising:
a dispersion compensator that performs dispersion compensation on an input light by a variable dispersion compensation amount;
a demodulator that demodulates the input light by causing delay and interference;
a detector that detects an error of a control phase amount of the delay and the interference;
an adjustor that adjusts the control phase amount to a predetermined phase amount, based on the detected error;
a monitor that monitors an error state of a data signal that is obtained by demodulation by the demodulator; and
a controller that
controls the adjustor to change, when the error state is in a predetermined state, the control phase amount from the predetermined phase amount,
determines whether a differential M-phase shift keying signal light, where $M=2^n$ and n is a positive integer, is included in the input light based on whether an error of the control phase amount that is detected after the control phase amount is changed changes according to a change of the control phase amount, and controls the dispersion compensator to stop the dispersion compensation based on whether the differential M-phase shift keying signal light is included in the input light.

2. The receiving device according to claim 1, wherein the controller controls the adjustor to stop adjustment of the control phase amount based on whether the differential M-phase shift keying signal light is included in the input light.

3. The receiving device according to claim 1, wherein the controller controls the monitor to stop monitoring the error state based on whether the differential M-phase shift keying signal light is included in the input light.

4. The receiving device according to claim 1, wherein
the monitor monitors a bit error rate of the data signal as the error state, and
the controller controls, when the bit error rate is lower than a threshold, the adjustor to change the control phase amount from the predetermined phase amount.

5. The receiving device according to claim 1, further comprising a notifier that notifies, when the error of the control phase amount does not change according to a change of the control phase amount, a transmitting device that has transmitted the input light that the input light is not properly received.

6. The receiving device according to claim 1, further comprising a notifier that notifies, when the error of the control phase amount changes according to a change of the control phase amount, a transmitting device that has transmitted the input light that the input light is properly received.

7. The receiving device according to claim 1, wherein the controller controls, when the error of the control phase amount changes according to a change of the control phase amount, the adjustor to adjust the control phase amount again to the predetermined phase amount.

8. A receiving method comprising:
performing dispersion compensation on an input light by a variable dispersion compensation amount;
demodulating the input light by causing delay and interference;
detecting an error of a control phase amount of the delay and the interference;
adjusting the control phase amount to a predetermined phase amount, based on the detected error;
monitoring an error state of a data signal that is obtained by demodulation at the demodulating;
changing, when the error state is in a predetermined state, the control phase amount from the predetermined phase amount;
determining whether a differential M-phase shift keying signal light, where $M=2^n$ and n is a positive integer, is included in the input light based on whether an error of the control phase amount that is detected after the control phase amount is changed changes according to a change of the control phase amount; and
stopping the dispersion compensation based on whether the differential M-phase shift keying signal light is included in the input light.

9. The receiving method according to claim 8, further comprising stopping adjustment of the control phase amount based on whether the differential M-phase shift keying signal light is included in the input light.

10. The receiving method according to claim 8, wherein
the monitoring includes monitoring a bit error rate of the data signal as the error state, and
the predetermined state is such a state that the bit error rate is lower than a threshold.

\* \* \* \* \*